United States Patent
Marsh

(10) Patent No.: US 9,752,860 B2
(45) Date of Patent: Sep. 5, 2017

(54) SYSTEM AND METHOD FOR GEAR MEASUREMENT

(71) Applicant: Caterpillar Inc., Peoria, IL (US)

(72) Inventor: Richard G. Marsh, Lugoff, SC (US)

(73) Assignee: Caterpillar Inc., Peoria, IL (US)

( * ) Notice: Subject to any disclaimer, the term of this patent is extended or adjusted under 35 U.S.C. 154(b) by 239 days.

(21) Appl. No.: 14/798,955

(22) Filed: Jul. 14, 2015

(65) Prior Publication Data

US 2017/0016708 A1 Jan. 19, 2017

(51) Int. Cl.
*G01B 5/008* (2006.01)
*G01B 5/20* (2006.01)

(52) U.S. Cl.
CPC .................... *G01B 5/202* (2013.01)

(58) Field of Classification Search
CPC ...................................... G01B 5/202
USPC ...................................... 33/501.14
See application file for complete search history.

(56) References Cited

U.S. PATENT DOCUMENTS

| | | | | |
|---|---|---|---|---|
| 3,757,425 A | * | 9/1973 | Bouillon | G01B 7/28 33/501.18 |
| 3,877,150 A | * | 4/1975 | Hofler | B23F 5/08 33/501.14 |
| 3,936,946 A | | 2/1976 | Ruffner et al. | |
| 4,062,125 A | * | 12/1977 | Maag | G01B 5/0002 33/501.14 |
| 4,166,323 A | * | 9/1979 | Maag | G01B 7/008 33/501.9 |
| 4,170,830 A | * | 10/1979 | Weber | G01B 5/004 33/501.14 |
| 4,519,242 A | * | 5/1985 | Hofler | G01B 5/202 33/501.9 |
| 4,532,715 A | * | 8/1985 | Sterki | G01B 7/283 33/501.9 |
| 4,610,091 A | * | 9/1986 | Bertz | G01B 7/283 33/501.15 |
| 4,646,443 A | * | 3/1987 | Hofler | G01B 7/146 33/501.15 |
| 5,052,117 A | * | 10/1991 | Kubodera | G01B 7/283 33/501.14 |
| 5,461,797 A | * | 10/1995 | Royer | G01B 5/202 33/501.14 |
| 7,251,580 B2 | | 7/2007 | Nomura et al. | |
| 7,792,651 B2 | * | 9/2010 | George | G01B 5/202 702/82 |

(Continued)

FOREIGN PATENT DOCUMENTS

CN 103344210 A 10/2013
WO WO 2009/024783 A1 2/2009

*Primary Examiner* — Christopher Fulton
(74) *Attorney, Agent, or Firm* — Leydig, Voit & Mayer, Ltd.

(57) ABSTRACT

A system and method is provided for measuring a physical parameter of a gear. The system and method includes moving a contact probe into a start position on the pitch circle of the gear in a gap between adjacent teeth. The contact probe is moved in a path substantially along the pitch circle of the gear until the contact probe contacts the flank of one of the adjacent gear teeth at a contact point. Spatial coordinates of the contact point are determined. A measurement of a physical parameter of the gear is determined based on the spatial coordinates of the contact point.

20 Claims, 3 Drawing Sheets

(56) References Cited

U.S. PATENT DOCUMENTS 7,792,653 B2    9/2010  Grupp et al.
8,991,246 B2 *  3/2015  Hirono .................. G01B 5/008
                                                         33/503

* cited by examiner

SYSTEM AND METHOD FOR GEAR MEASUREMENT

TECHNICAL FIELD

This disclosure relates generally to gears and, more particularly, to a system and method for measuring gears.

BACKGROUND

The curved surfaces of gears often need to be machined to a high degree of precision in order to meet design specifications. Gear measurement systems may be used to determine whether a finished gear meets the design specifications. Design specifications for gears often define the gear dimensions at the pitch circle. One gear measurement system, known as a gear checker, involves arranging a probe between two adjacent teeth of a gear along the pitch circle. The gear is then rotated until the flank of one of the gear teeth comes into contact with the probe. The gear dimension at the pitch circle can then be determined based on the distance which the gear needed to rotate in order for the tooth flank to contact the probe.

More modern gear measurement systems may employ coordinate measuring machines. With such systems, the gear is held stationary and the probe is moved into contact with the flank of a tooth of the gear. Before moving the probe, the system determines approach vectors that define the path the probe will take when moving into contact with the tooth flank at the pitch circle. The approach vectors, however, can result in the probe passing the pitch circle before the probe contacts the tooth flank. When this happens, the system can produce an incorrect value for the gear profile measurement at the pitch circle. This can lead to incorrect determinations of tooth thickness, tooth spacing and other measurements that rely upon the profile measurement at the pitch diameter.

A system that can be used to measure the curved surface of a gear is disclosed in U.S. Pat. No. 7,251,580. The system employs a coordinate measuring machine that determines a theoretical expression of the gear tooth surface, and then determines a measuring area on the tooth surface. The system defines a representative point in the measuring area, determines an axis angle of the probe and then measures the measuring area white holding the axis angle of the probe constant. The system, however, does not address the problem of the approach vector used for the probe resulting in the probe passing the pitch circle before the probe contacts the tooth flank.

SUMMARY

In one aspect, the disclosure describes a method for measuring a physical parameter of a gear. The gear has a pitch circle and a plurality of teeth with adjacent teeth separated by a gap that is defined by a flank of each of the adjacent teeth. The method includes moving a contact probe into a start position on the pitch circle of the gear in a gap between adjacent teeth. The contact probe is moved in a path substantially along the pitch circle of the gear until the contact probe contacts the flank of one of the adjacent gear teeth at a contact point. Spatial coordinates of the contact point are determined. A measurement of a physical parameter of the gear is determined based on the spatial coordinates of the contact point.

In another aspect, the disclosure describes a gear measurement system for measuring a physical parameter of a gear. The gear has a pitch circle and a plurality of teeth with adjacent teeth separated by a gap that is defined by a flank of each of the adjacent teeth. The gear measurement system includes a contact probe configured to produce a signal when the contact probe contacts the flank of a gear tooth. A probe positioning system is configured to move the contact probe in at least two-dimensional space. A controller is in communication with the contact probe and the probe positioning system and is configured to direct movement of the contact probe by the probe positioning system. The controller is configured to direct the probe positioning system to move the contact probe to a starting position on the pitch circle in a gap between adjacent teeth. The controller directs movement of the contact probe in a path substantially along the pitch circle until the contact probe contacts the flank of one of the adjacent gear teeth at a contact point. The controller determines spatial coordinates of the contact point and determines a measurement of a physical parameter of the gear based on the spatial coordinates of the contact point.

In yet another aspect, the disclosure describes a method for measuring a physical parameter of a gear. The gear having a pitch circle and a plurality of teeth with adjacent teeth separated by a gap that is defined by a flank of each of the adjacent teeth. The method including determining an approach vector for moving the contact probe from a current position to a start position on the pitch circle of the gear in a gap between adjacent teeth and moving the contact probe to the start position using the approach vector. A path from the start position along the pitch circle is determined by dividing a segment of the pitch circle into a plurality of circumferentially spaced points and determining vectors that define paths of travel for the contact probe between those points that substantially match the pitch circle. The contact probe is moved along the path until the contact probe contacts the flank of one of the adjacent gear teeth at a contact point. The spatial coordinates of the contact point are determined and a measurement of a physical parameter of the gear is determined based on the spatial coordinates of the contact point.

DETAILED DESCRIPTION

Figure 1:
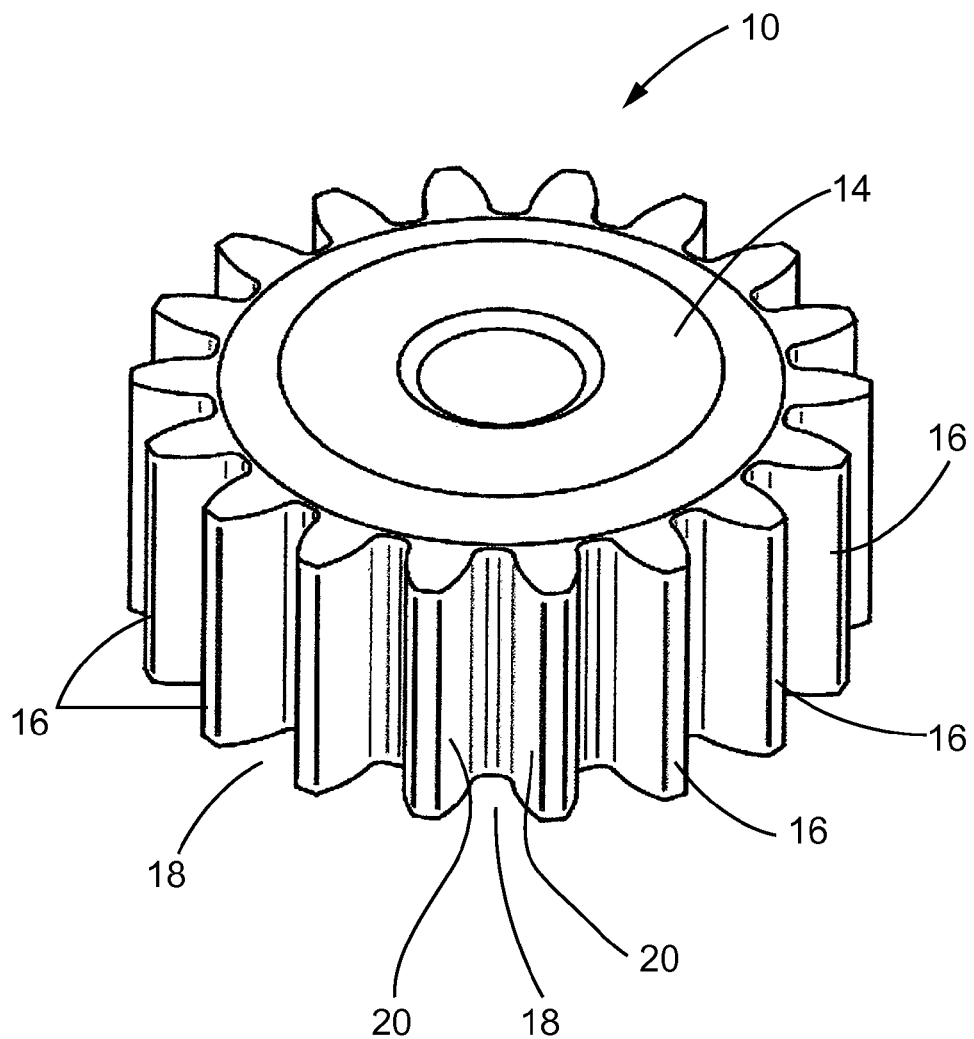
FIG. 1 is a perspective view of an exemplary gear with which the system and method of the present disclosure may be used.

This disclosure generally relates to a system and method for measuring one or more physical parameters of a gear such as for use in determining whether a gear has been manufactured within predetermined design specifications. An exemplary gear 10 on which the gear measurement system 12 of the present disclosure may be used to determine at least one dimension of the gear 10 is shown in FIG. 1. The illustrated gear 10 includes a circular disc shaped body 14 with a plurality of teeth 16 spaced around the circumferential surface of the body 14 with each tooth 16 extending in a radial direction with respect to the body 14. The adjacent teeth 16 of the gear 10 are separated from each other by a gap 18 that is defined by the flanks 20 of the adjacent teeth 16.

Figure 2:
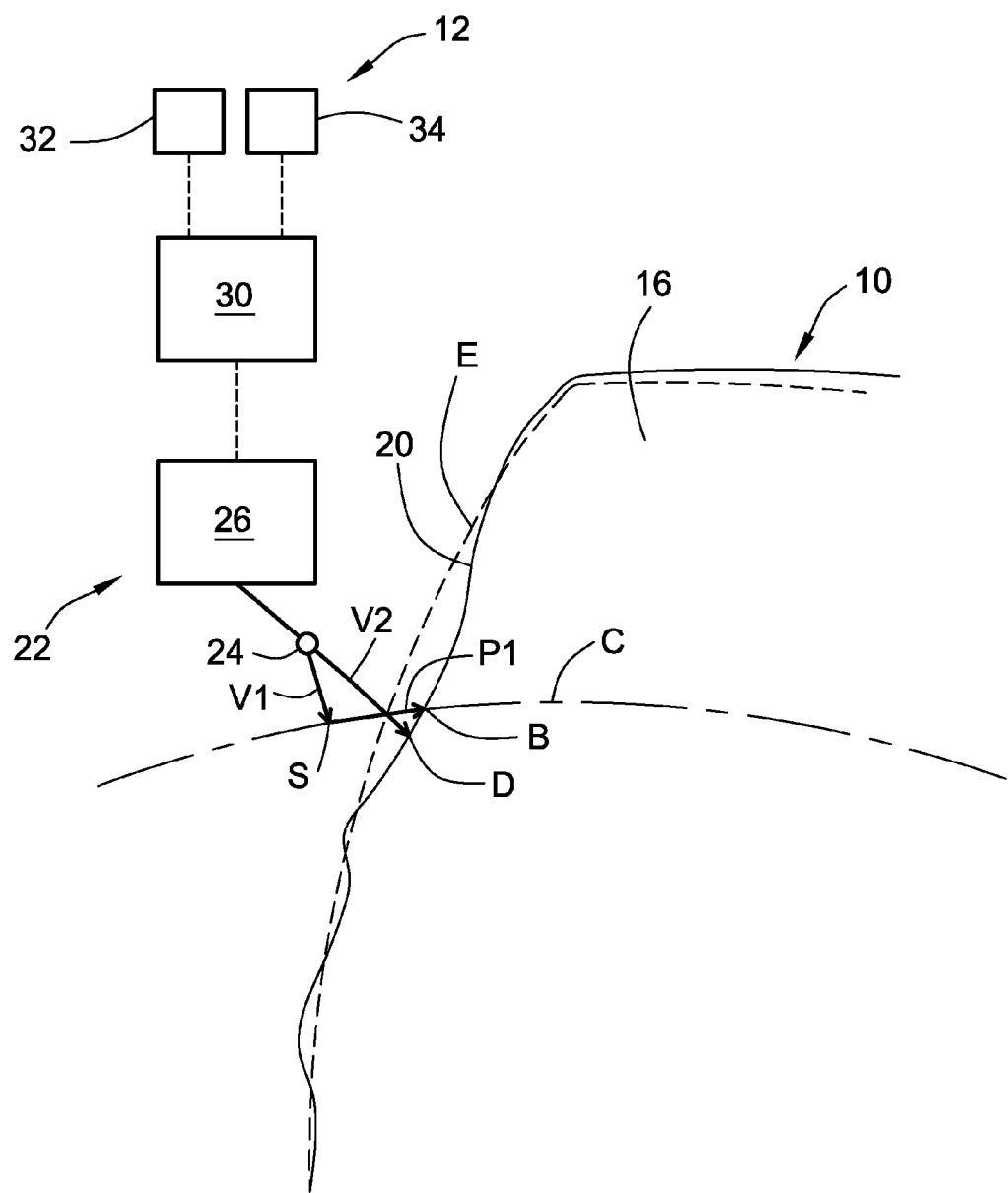
FIG. 2 is a schematic view of a gear measurement system according to the present disclosure being used to measure the gear of FIG. 1.

A schematic, enlarged view of a portion of the flank 20 of tooth 16 of the gear 10 is shown in FIG. 2. The flanks 20 of each tooth 16 may have a substantially involute configuration. In a known manner, the gear 10 may be configured so as to have a predetermined characteristic pitch circle C, which is shown for example by a broken line in FIG. 2. While a spur gear is shown in FIG. 1, those skilled in the art will appreciate that the gear measurement system 12 of the present disclosure is not limited to spur gears. Rather, the gear measurement system 12 may be used to determine one or more physical parameters of any type of gear having a characteristic pitch circle C.

As shown schematically in FIG. 2, the gear measurement system 12 may include a coordinate measuring machine 22 having a contact probe 24 and a probe positioning system 26. The contact probe 24 may be configured to produce a signal upon coming into contact with a surface of a gear arranged in a test position, such as on a test stand. The probe positioning system 26, in turn, may be adapted to move the contact probe 24 in at least two dimensional space relative to the gear 10 being measured. For example, the probe positioning system 26 could be a robotic arm that can move the contact probe 24 in two or three dimensional space or a gantry type arrangement including separate rails and carriages for the different directions, such as the x, y and z directions. The gear measurement system 12 may further include a controller 30 operably connected to the contact probe 24 and the probe positioning system 26. The controller 30 may be configured to direct operation of the probe positioning system 26 and receive information from the contact probe 24 including the signal produced by the contact probe 24 when it contacts a surface of the gear 10. The controller 30 may further be configured to determine the spatial coordinates of the contact probe 24 when it is actuated and produces a signal when contacting a surface of the gear. In addition to the contact probe 24, the gear measurement system 12 may also include a further input device 32 in communication with the controller 30 that may be used to the input information to the controller 30. This further input device 32 may be a keyboard, a desktop computer or computer server that communicates with the controller 30.

The gear measurement system 12 may include a display 34 that may be located either at the coordinate measuring machine 22 or located remotely. The display 34 may be communication with the controller 30 and be used to display one or more dimensions or parameters of the gear 10 as measured by the gear measurement system 12 as described further below. The type of display 34 that may be used include, for example, cathode ray tube display (CRT), light-emitting diode display (LED), liquid crystal display (LCD), organic light-emitting diode display (OLED) or a plasma display panel (PDP). Such displays can also be a touch-screen and may incorporate aspects of an input device for entering information into the controller.

The controller 30 may include a processor (not shown) and a memory component (not shown). The processor may be microprocessors or other processors as known in the art. In some embodiments the processor may be made up of multiple processors. Instructions associated with the methods described may be read into, incorporated into a computer readable medium, such as the memory component, or provided to an external processor. In alternative embodiments, hard-wired circuitry may be used in place of or in combination with software instructions. Thus, embodiments are not limited to any specific combination of hardware circuitry and software.

The functionality of the controller 30 may be distributed so that certain functions are performed at the coordinate measuring machine 22 and other functions are performed remotely. In such case, the controller 30 may include a communications system such as a wireless network system for transmitting signals between the coordinate measuring machine 22 and a system located remote from the coordinate measuring machine 22. Additionally, while the controller 30 is illustrated schematically in FIG. 2 as a single unit, in other aspects the controller 30 may be distributed as a plurality of distinct but interoperating units, incorporated into another component, or located at a different location on or off the coordinate measuring machine. The term "controller" is meant to be used in its broadest sense to include one or more controllers and/or microprocessors that may be associated with the coordinate measuring machine or the gear measurement system and that may cooperate in controlling various functions of the and operations of the gear measurement system 12. The functionality of the controller 30 may be implemented in hardware and/or software without regard to the functionality.

The term "computer-readable medium" as used herein refers to any medium or combination of media that is non-transitory, participates in providing computer-executable instructions to a processor for execution facilitating performing a method, implemented by a programmable controller. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read. The memory component of the controller may include any form of computer-readable media as described above. The memory component may include multiple memory components.

Figure 3:
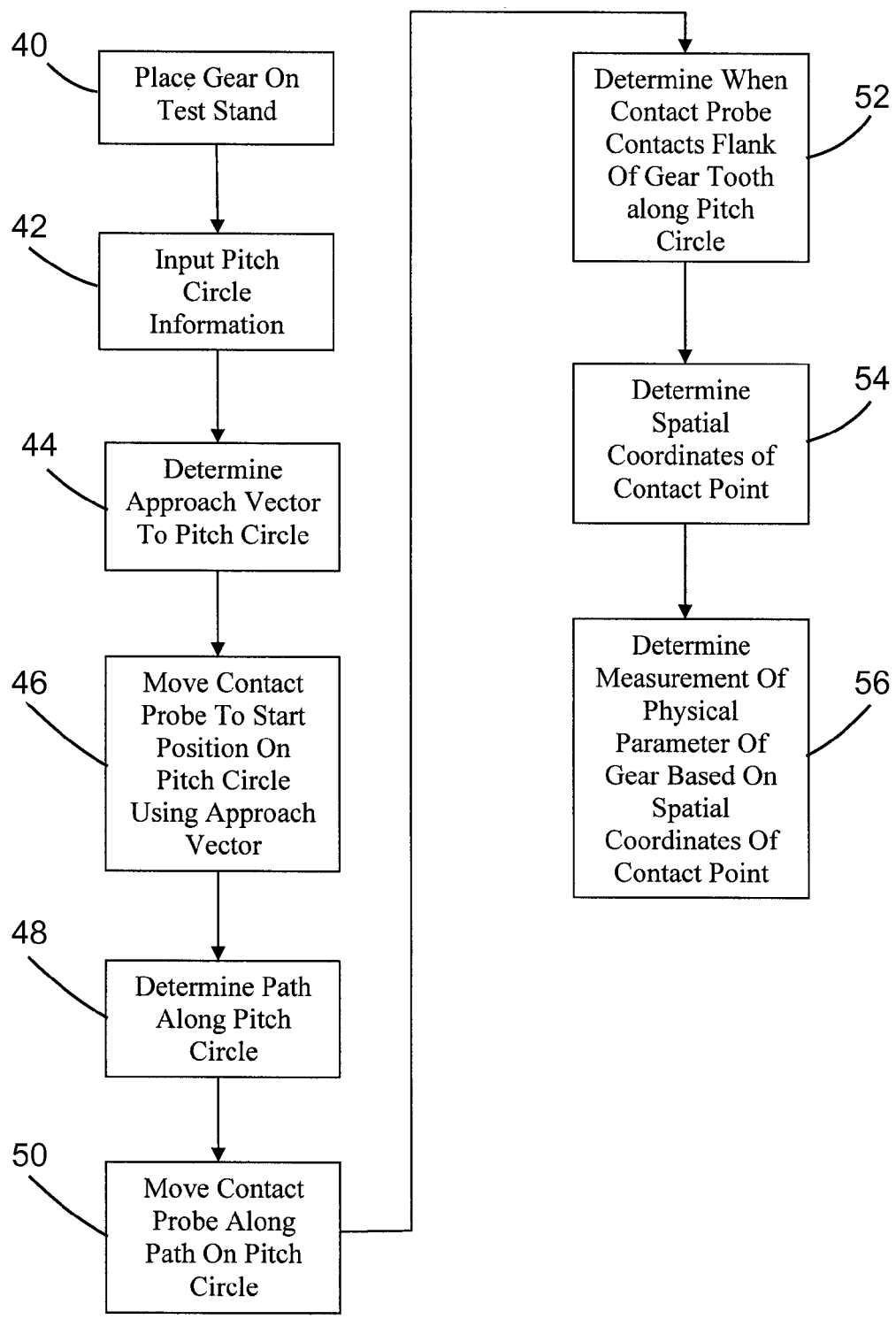
FIG. 3 is a flow chart of a gear measurement method according to the present disclosure.

A series of steps that the controller 30 may be configured to perform in connection with using the gear measurement system 12 to measure one or more physical parameters associated with a gear 10 are shown in the flow chart of FIG. 3. In particular, the steps may be performed by the controller 30 in connection with using the gear measurement system 12 to measure the profile of the flank 20 of a tooth 16 of a gear 10 at the pitch circle C of the gear. In the first step 40 shown in FIG. 3, a gear 10 to be measured is placed on a test stand associated with the coordinate measuring machine 22. Next, information regarding the pitch circle C of the gear 10 to be measured, such as the size of the pitch circle C, is input into the controller 30 in step 42. To this end, the controller 30 may be configured to receive and store information relating to the size of the pitch circle C of the gear 10 to be measured. For instance, the diameter of the pitch circle C could be input into the controller 30 by an operator through the input device 32. Alternatively, the controller 30 may include one or more look-up tables in which pitch circle C diameters of different types of gears are stored. The controller 30 may then be directed to look-up the pitch circle diameter based on information input into the controller 30 through the input device 32 relating to the type of gear to be measured. While the steps are shown in a particular order in FIG. 3, it should be understood that the steps need not be performed in that order. For instance, the information from which the diameter of pitch circle C the gear 10 may be derived may be input into the controller 30 before the gear 10 is placed on the test stand.

The controller 30 may then direct the probe positioning system 26 to move the contact probe 24 into a start position S on the pitch circle C that is not in contact with the gear 10. To this end, in step 44, the controller 30 may first determine an approach vector V1 that moves the contact probe 24 from its current position to a point on the pitch circle C of the gear 10, but that is not in contact with a flank 20 of any of the teeth 16 the gear 10. More particularly, the approach vector V1 determined by the controller 30 may be configured to move the contact probe 24 to a point on the pitch circle C in the gap 18 between adjacent teeth 16 of the gear 10 that would not reasonably be expected to be in contact with any portion of a gear tooth 16 even assuming a reasonable amount of imperfection in the machining of the gear 10. This point on the pitch circle C may represent the start position S. Next, in step 46, the controller 30 may use the approach vector V1 determined in step 44 to direct the probe positioning system 26 to move the contact probe 24 to the start position S on the pitch circle C.

Once the contact probe 24 is in the start position S on the pitch circle C, the controller 30 may then direct the probe positioning system 26 to move the contact probe 24 in a path P1 substantially along the pitch circle C until it contacts the flank 20 of a tooth 16 of the gear 10. The controller 30 may accomplish this by first, in step 48, determining a path P1 along the pitch circle C that the contact probe 24 is going to travel. For example, the controller 30 may divide a segment of the pitch circle C into a series of discrete points and vectors. More specifically, the controller 30 may determine a series of circumferentially spaced apart points on the pitch circle C and then determine a series of vectors that define paths of travel for the contact probe 24 between those points that substantially match the pitch circle C. Once the controller 30 has determined the path P1 along the pitch circle C, it may direct the probe positioning system 26 to move the contact probe 24 along the path P1 in step 50.

In step 52, the controller 30 may determine when the contact probe 24 comes into contact with the flank 20 of the gear tooth 16. In one embodiment, the contact probe 24 may produce a signal that is directed to the controller 30 when the contact probe 24 contacts the flank 20 of the gear tooth 16. Upon receiving this signal, the controller 30 may be configured to determine the spatial coordinates for the contact point B where the contact probe 24 contacts the gear tooth flank 20 in step 54. For example, the controller 30 may determine the spatial coordinates of the contact point B using information regarding the orientation or configuration of the probe positioning system 26 at the time that the contact probe contacts the gear tooth flank. Methods by which the coordinate measuring machine 22 can determine the contact point B of a contact probe 24 are well known in the art.

In step 56, the controller 30 may determine a measurement of a physical parameter of the gear using the spatial parameters of the contact point B. According to one embodiment, the physical parameter determined by the controller 30 may be a tooth profile measurement at the pitch circle C. The controller 30 may also be configured to calculate or otherwise determine other measurements of physical parameters of the gear 10 that are associated with the tooth profile measurement such as, for example, tooth thickness and tooth spacing. Once the controller 30 has determined one or more measurements of physical parameters of the gear 10, the controller 30 may direct the display 34 to show the one or measurement parameters for an operator of the gear measurement system 12. The controller 30 may also be configured to store the one or measurements, as well as the associated underlying data, in memory.

INDUSTRIAL APPLICABILITY

The gear measurement system 12 and associated method of the present disclosure can be used to determine a measurement parameter of any gear having known pitch circle. In contrast to gear measurement systems that use a single approach vector to move the contact probe into contact with the gear tooth flank, the gear measurement system 12 and method of the present disclosure which moves the contact probe 24 along the pitch circle C produces more accurate measurements of the physical parameters of the gear 10. As explained in further detail below, the measurement errors that can be produced using a single approach vector can be significant enough to result in gears that actually meet design specifications being scrapped because they are measured as out of specification and gears that actually do not meet design specifications being accepted.

When the machined tooth flank 20 does not match the desired configuration at the pitch circle C, using a single approach vector (labeled V2 in FIG. 2) can result in the contact probe moving past the pitch circle C before it comes into contact with the flank of the gear tooth at a point referenced as D in FIG. 2. In FIG. 2, the actual machined flank 20 of the tooth 16 is shown in a solid line and an ideal involute flank E is shown in broken lines. If the contact probe contacts the tooth flank surface at a point D, for example, below the pitch circle C, the controller of a single approach vector system can extrapolate the contact point D back up to the pitch circle C based upon an ideal involute flank E (shown in broken lines in FIG. 2) and then uses that extrapolated value to determine the measurement parameter. However, this extrapolation can yield inaccurate results in the measurements if the machined flank 20 of the tooth 16 does not match the ideal involute flank E, which it generally does not, particularly in the section of the flank surface in which the extrapolation is occurring (i.e., the section between where the probe contacts the flank surface and the where the pitch circle intersects the flank surface). In other words, the point on the pitch circle C to which the controller extrapolates may not be on or even relatively close to the surface of the tooth flank 20. As a result, this extrapolation can produce inaccurate results. Because the disclosed system and method moves the contact probe along the pitch circle until it contacts the surface of the gear flank, it eliminates the need to extrapolate along an ideal involute curve and, as a result, can produce more accurate measurements.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method for measuring a physical parameter of a gear, the gear having a pitch circle and a plurality of teeth with adjacent teeth separated by a gap that is defined by a flank of each of the adjacent teeth, the method comprising:

moving a contact probe into a start position on the pitch circle of the gear in a gap between adjacent teeth;

moving the contact probe in a path substantially along the pitch circle of the gear until the contact probe contacts the flank of one of the adjacent gear teeth at a contact point;

determining spatial coordinates of the contact point; and determining a measurement of a physical parameter of the gear based on the spatial coordinates of the contact point.

2. The method of claim 1 wherein the step of moving the contact probe into the start position involves determining an approach vector for moving the contact probe from a current position to the start position.

3. The method of claim 1 wherein the step of moving the contact probe in the path along pitch circle involves dividing a segment of the pitch circle into a plurality of circumferentially spaced points and determining vectors that define paths of travel for the contact probe between those points that substantially match the pitch circle.

4. The method of claim 1 further including the step of determining the pitch circle of the gear.

5. The method of claim 1 further including the step of displaying the measurement of the physical parameter.

6. The method of claim 1 wherein the measurement of the physical parameter is a tooth profile.

7. The method of claim 1 wherein the measurement of the physical parameter is a tooth thickness.

8. The method of claim 1 wherein the measurement of the physical parameter is tooth spacing.

9. The method of claim 1 wherein the measurement of the physical parameter is a tooth profile.

10. The method of claim 1 wherein the measurement of the physical parameter is a tooth thickness.

11. The method of claim 1 wherein the measurement of the physical parameter is tooth spacing.

12. A gear measurement system for measuring a physical parameter of a gear, the gear having a pitch circle and a plurality of teeth with adjacent teeth separated by a gap that is defined by a flank of each of the adjacent teeth, the gear measurement system comprising:

a contact probe configured to produce a signal when the contact probe contacts the flank of a gear tooth;

a probe positioning system configured to move the contact probe in at least two-dimensional space; and a controller in communication with the contact probe and the probe positioning system and being configured to direct movement of the contact probe by the probe positioning system, the controller being configured to:

direct the probe positioning system to move the contact probe to a starting position on the pitch circle in a gap between adjacent teeth;

move the contact probe in a path substantially along the pitch circle until the contact probe contacts the flank of one of the adjacent gear teeth at a contact point;

determine spatial coordinates of the contact point; and determine a measurement of a physical parameter of the gear based on the spatial coordinates of the contact point.

13. The gear measurement system of claim 12 wherein the controller determines an approach vector for moving the contact probe from a current position to the start position.

14. The gear measurement system of claim 12 wherein the controller determines the path along pitch circle by dividing a segment of the pitch circle into a plurality of circumferentially spaced points and determining vectors that define paths of travel for the contact probe between those points that substantially match the pitch circle.

15. The gear measurement system of claim 12 further including an input device in communication with the controller and configured for inputting information relating to the pitch circle of the gear.

16. The gear measurement system of claim 12 further including a display in communication with the controller and configured to display the measurement of the physical parameter.

17. The gear measurement system of claim 12 wherein the measurement of the physical parameter is a tooth profile.

18. The gear measurement system of claim 12 wherein the measurement of the physical parameter is a tooth thickness.

19. The gear measurement system of claim 12 wherein the measurement of the physical parameter is tooth spacing.

20. A method for measuring a physical parameter of a gear, the gear having a pitch circle and a plurality of teeth with adjacent teeth separated by a gap that is defined by a flank of each of the adjacent teeth, the method comprising:

determining an approach vector for moving the contact probe from a current position to a start position on the pitch circle of the gear in a gap between adjacent teeth;

moving the contact probe to the start position using the approach vector;

determining a path from the start position along the pitch circle by dividing a segment of the pitch circle into a plurality of circumferentially spaced points and determining vectors that define paths of travel for the contact probe between those points that substantially match the pitch circle moving the contact probe along the path until the contact probe contacts the flank of one of the adjacent gear teeth at a contact point;

determining spatial coordinates of the contact point; and determining a measurement of a physical parameter of the gear based on the spatial coordinates of the contact point.

* * * * *